(12) United States Patent
Miller et al.

(10) Patent No.: US 6,871,744 B2
(45) Date of Patent: Mar. 29, 2005

(54) APPARATUS FOR ELECTRODEWATERING

(75) Inventors: Sarah A Miller, North Ryde (AU);
Barry Kenneth Johnston, Keiraville (AU); Christopher Veal, Bishops Cleeve (GB)

(73) Assignee: CRC For Waste Management & Pollution Control Limited, Kensington (AU)

( * ) Notice: Subject to any disclaimer, the term of this patent is extended or adjusted under 35 U.S.C. 154(b) by 139 days.

(21) Appl. No.: 10/332,184

(22) PCT Filed: May 9, 2001

(86) PCT No.: PCT/AU01/00525

§ 371 (c)(1),
(2), (4) Date: Apr. 10, 2003

(87) PCT Pub. No.: WO01/85305

PCT Pub. Date: Nov. 15, 2001

(65) Prior Publication Data
US 2003/0150789 A1 Aug. 14, 2003

(30) Foreign Application Priority Data
May 10, 2000 (AU) ............................................. PQ7418

(51) Int. Cl.[7] .............................................. C02F 1/469
(52) U.S. Cl. ....................... 210/350; 210/358; 210/391; 210/400; 210/402; 210/407; 204/648; 204/660; 204/665

(58) Field of Search ................................. 210/160, 350, 210/358, 391, 400, 402, 407; 204/648, 660, 665

(56) References Cited

U.S. PATENT DOCUMENTS

| | | | | |
|---|---|---|---|---|
| 4,107,026 A | * | 8/1978 | Freeman | ...................... 204/629 |
| 4,861,496 A | | 8/1989 | Diaz | |
| 5,292,421 A | | 3/1994 | Senapati et al. | |
| 5,401,375 A | | 3/1995 | Yamaguchi et al. | |
| 5,891,342 A | | 4/1999 | Tije | |

FOREIGN PATENT DOCUMENTS

| | | |
|---|---|---|
| JP | 0038012 | 2/1985 |
| JP | 2171430 | 7/1990 |
| JP | 4018906 | 1/1992 |
| JP | 4126507 | 4/1992 |

* cited by examiner

Primary Examiner—Betsey Morrison Hoey
(74) Attorney, Agent, or Firm—Ladas & Parry LLP

(57) ABSTRACT

A solid-liquid mixture is electro-dewatered by apparatus having a conveyor belt for receiving an electric charge and having the mixture deposited thereon and an element above the conveyor belt receiving an opposite electric charge with the conveyor belt an element cooperating to apply a compressive force to the mixture and characterised by the conveyor belt including discrete electrically conducted segments which are permeable to the liquid. The upper element is preferably in the form of a rotary drum or second conveyor belt but it can be in the form of a pressure plate.

18 Claims, 4 Drawing Sheets

APPARATUS FOR ELECTRODEWATERING

FIELD OF THE INVENTION

The present invention relates to apparatus for electrodewatering and recovery of solid material from solid-liquid mixtures. The invention will primarily be described with reference to its use during water treatment operations for sewage sludge or other high water sludge materials, but the invention can have broader use in other slurry or pulp dewatering applications.

BACKGROUND ART

Dewatering is a process in which liquid is separated from solid with no accompanying phase change of the liquid. Commonly, mechanical dewatering apparatus is used for such purposes, examples including belt press filters, filter presses, roller presses, vacuum filters or centrifuges. Electrical dewatering techniques are also available, such as electro-osmosis, or the use of magnetic fields. Electro-osmosis is the phenomenon of liquid moving through a porous medium under the application of a direct current electric field. Under these circumstances the positive metal ions can migrate to the negatively charged cathode, transporting water with them probably via viscous interactions, molecular collisions and/or as a hydration sheath. This technique is particularly effective for dewatering materials which are difficult to dewater using mechanical pressure alone such as fine or colloidal particle suspensions, sewage sludge, silt sludge or gelatinous materials. However, these solid-liquid mixtures, filter cake permeability is often very poor. Negatively charged particles will be repelled by the cathode, thereby reducing fine particle clogging of any associated filter medium and allowing better drainage of the interstitial fluid past that cathode.

By combining the driving forces for dewatering from both mechanical and electrical sources a cumulative effect can be achieved which is important in the search for a higher efficiency solid/liquid separation process. Parameters such as filtration rate, final cake moisture content and power consumption are taken into consideration.

U.S. Pat. No. 5,401,375 (Yamaguchi et al) describes a revolving anode and a moving filter belt positioned over a taut metallic cathode, the system being designed to apply electro-osmosis and mechanical compression simultaneously. It is important with such equipment that the maximum pressure and maximum electric field occurs at the same locations with only a very small distance between anode and cathode to ensure a low voltage drop and high electrical efficiency. In U.S. Pat. No. 5,401,375 various embodiments are described wherein a thin sludge-receiving space is provided between a rotary drum anode and a water transmissive press belt which functions as a cathode. Electrode elements are provided for direct contact with the sludge; these elements are in the form of an anode wire or plate depending on the embodiment. An electric field applied over an extensive area is thus provided and Yamaguchi et al describes methods for dealing with water and gas at the anode which is said to occur due to electrolysis. Water in the sludge is, however, discharged towards the cathode through a filter cloth belt which supports the sludge on top of a press belt; the belt is connected as a cathode and has drain holes. Yamaguchi et al suggests that this arrangement is preferable to earlier prior art arrangements in which insulating belts cover both anode and electrode surfaces and significantly reduce conductivity between the sludge and the electrodes.

In a similar application, ZA910538 describes apparatus which can apply electro-osmosis and mechanical compression by means of two endless belt electrodes, the anode belt being constructed from carbon fibres or electrically conductive synthetic materials, and the cathode belt consisting of a belt made of metallic mesh, with a second belt of filter cloth material to support the resultant filter cake located between the feed slurry and the cathode belt. In use the sludge is squeezed between the two belts. Once again, no details are provided of the particular construction of the water transmissive belt cathode. Further, the layer of filter cloth acts as a significant insulating barrier, reducing the conductivity able to be maintained between the sludge and electrode belts.

Similarly, U.S. Pat. No. 5,891,342 describes dewatering in a flocculated sludge using a compressive belt filter containing electrically conductive material, where the belt is comprised across its width of a plurality of connected spiral yarns, the yarns being made of polyester or polyamide helical coils and the electrically conductive material is merely woven or inserted into these spiral yarns. U.S. Pat. No. 5,891,342 describes how the belt may wholly comprise electrically conductive material inserted into the base material of the belt, extending right through the belt as well as being located in each coil. The electrically conductive material comprises wires or strips needled to one or both sides of the belt, so that the belt is fully water transmissive across its width. However, a tendency in this sort of apparatus is for the electrical current to short-circuit via the edge of the belt to other parts of the apparatus, and bypass the wet filter cake.

In further examples available in the art, industrial belt filters have been adapted for electro-osmosis by placing a perforated cathode below the filter belt, and making use of a stainless steel pressure plate at the topside of the sludge as an anode. U.S. Pat. No. 4,861,496 describes an anode in such equipment which features metal bristles or wires which protrude into the sludge mass, with a cathode below the filter belt but the form of the arrangement is not described. In such a case the anode design is of principal interest.

Other devices exist where a revolving anode has a moving filter belt pass between it and a revolving cathode, the two electrode drums being used to apply electro-osmosis and mechanical compression simultaneously, but where the filter belt is manufactured of a non-conductive fabric.

SUMMARY OF THE INVENTION

The present invention provides apparatus for electrodewatering and recovery of solid material from a solid-liquid mixture, the apparatus having:

a conveyor belt adapted for receiving the solid-liquid mixture thereon and for receiving an electric charge; and an element positioned above the conveyer belt and adapted for receiving an opposite electric charge to the conveyor belt;

wherein the conveyor belt and element are adapted for applying a compressive force to the mixture, and wherein the adaptation of the conveyor belt for receiving the electric charge includes a plurality of discrete electrically conductive segments permeable to the liquid and located on or within the conveyor belt such that in use the conveyor belt and the element can be charged so that liquid is caused to pass through the segments.

Preferably each segment is formed from woven metallic wire mesh, and each segment is externally affixed at all sides thereof to the conveyor belt.

More preferably the segments are formed from woven metallic wire mesh woven into the conveyor belt.

Preferably the segments each lie flush within the conveyor belt.

The configuration of each conductive segment can vary but preferably there is a multiplicity of such segments closely spaced from one another by insulating material of the conveyor belt and the segments sequentially pass through in contact with an electrical connector whereby an effective electric field is established in a zone where pressure is exerted on the solid-liquid mixture and electro-osmosis occurs efficiently with liquid urged away for discharge. One particularly effective embodiment of the invention is where each of the segments is a rectangular body integrated in a flush manner into the conveyor belt with edges of each segment closely spaced from the edge of the conveyor belt and small gaps between each successive segment.

A preferred embodiment is one wherein the element above the conveyor belt is in the form of a rotary drum around which runs a filter cloth belt but other configurations could be used such as the use of a second conveyor belt alone as the element or a pressure plate arrangement.

A preferred embodiment is one in which the element above the conveyor belt is connected to become a cathode and the conductive segments on the conveyor belt are adapted to be connected to become separate anodes. Advantageously the apparatus has an electrical circuit connected directly to the element and contact rolls are provided at a fixed position and provide cathode connections with rolling engagement with the conductive segments in turn. This arrangement is especially beneficial at achieving an effective electrical field which is economic on power consumption and significantly enhances the removal of liquid.

At a downstream location preferably a device for removing dried filter cake from the conveyor belt is provided. Periodically backwashing of the conveyor belt will be required. However, particularly with preferred embodiments where the element is a roller connected as a cathode, water efficiently migrates towards the roller and can be discharged.

Preferably the invention is embodied in an apparatus where upstream of the location at which the electric field is established the application of compression occurs to aid gravity whereby the solid-liquid mixture drains through the conveyor belt and, in a preferred embodiment, through the conductive segments.

Preferably electrical supply means are adapted to provide a voltage across the conveyor belt and element, such that in use the element becomes cathodic in nature and the conveyor belt anodic in nature or vice versa.

Preferably means are provided for collecting and removing water which passes through the conveyor belt segments.

Preferably means are provided for removing dried filter cake containing solids from the conveyor belt.

Preferably a conveyor belt is provided which is in the form of an endless conveyor belt which provides a continuous support surface for the solid-liquid mixture.

BRIEF DESCRIPTION OF THE DRAWINGS

Notwithstanding any other forms which may fall within the scope of the present invention, a preferred form of the invention will now be described, by way of example only, with reference to the accompanying drawings in which.

MODES FOR CARRYING OUT THE INVENTION

Figure 1:
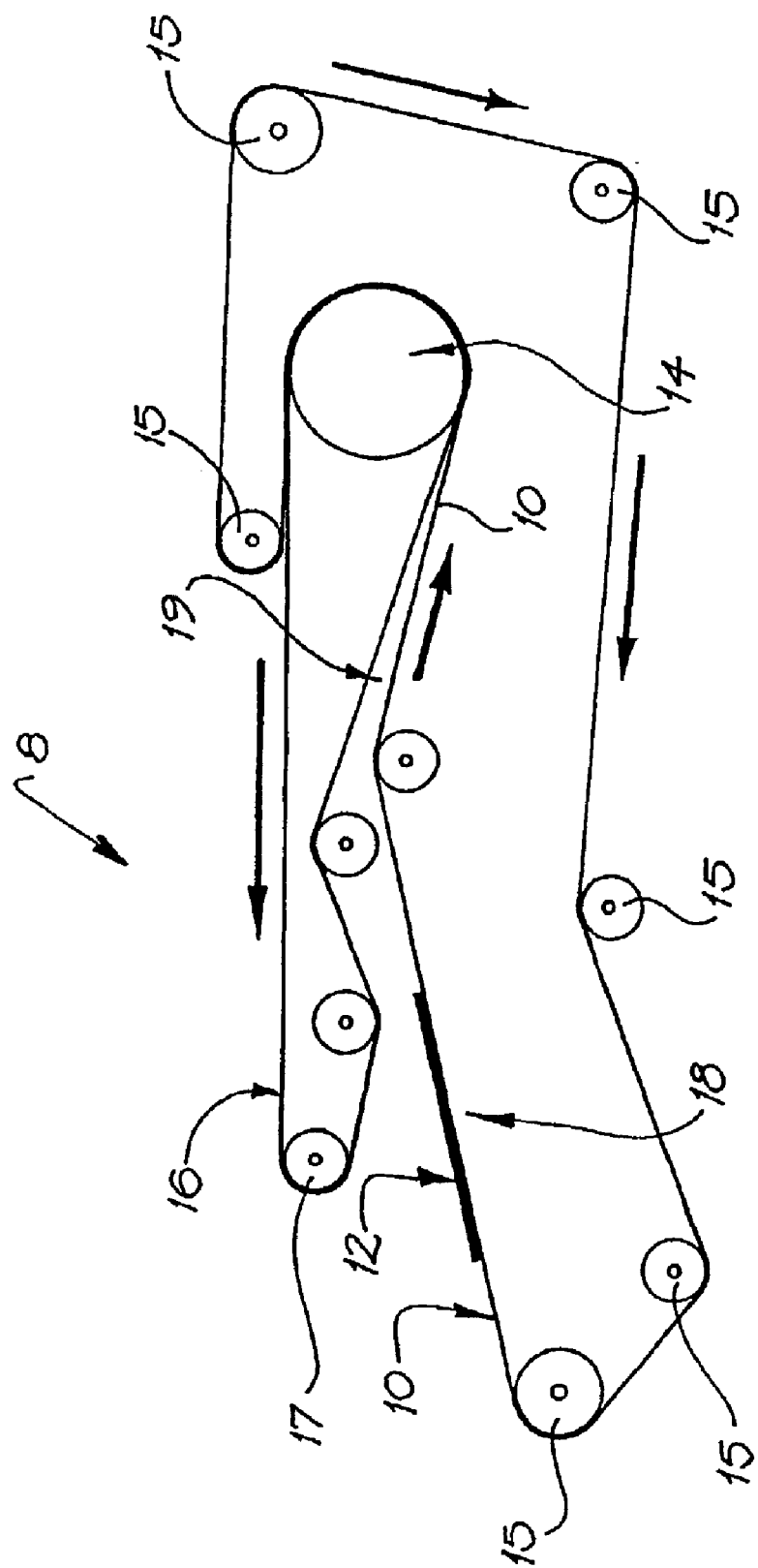
FIG. 1 shows a side elevation schematic view of a single roll belt press filter apparatus for dewatering in accordance with the invention.

Referring to the drawings, apparatus 8 for the electrode-watering and recovery of solid material from a sludge is shown. The apparatus 8 includes a primary porous conveyor belt 10 which is mounted to be driven in a closed loop over rollers 15 and a main rotary drum 14. A secondary porous conveyor belt 16 is also driven around the rotary drum 14 and is located between the drum 14 and the primary conveyor belt 10 and is further guided around rollers 17.

In use, the primary conveyor belt 10 receives a solid-liquid mixture or sludge 12 thereon in a continuously deposited layer, in what is known as a 'drainage zone' 18 where excess or easily removed water from the sludge 12 descends through the primary porous belt 10 under the influence of gravity. A 'wedge zone' 19 is disposed immediately upstream of the rotary drum 14 and in this zone the secondary (in this case upper) porous conveyor belt 16 moves progressively closer toward the primary porous conveyor belt 10. In the wedge zone 19 a compressive force is applied to the sludge 12 and the compressive force increases as the belts 10, 16 move around the rotary drum 14 so that the thickness of the sludge filter cake which is formed is progressively reduced. The rotary drum 14 is hollow and has a porous outer surface structure whereby water migrating radially inwardly of the rotary drum 14 can be discharged through the centre of the drum 14.

Figure 2:
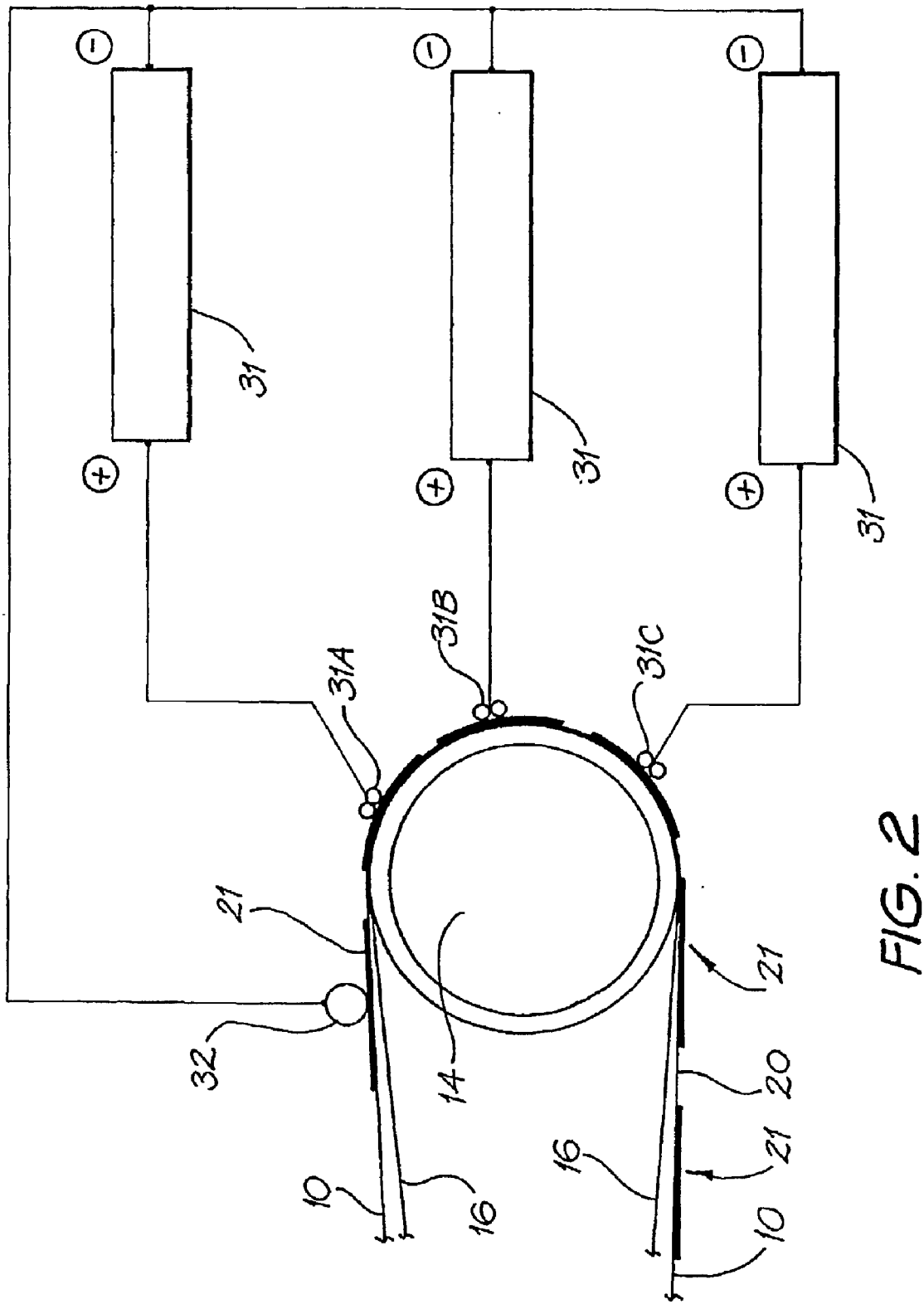
FIG. 2 in a schematic side view on an enlarged scale showing the roller and belt with conducting segments.
Figure 3:
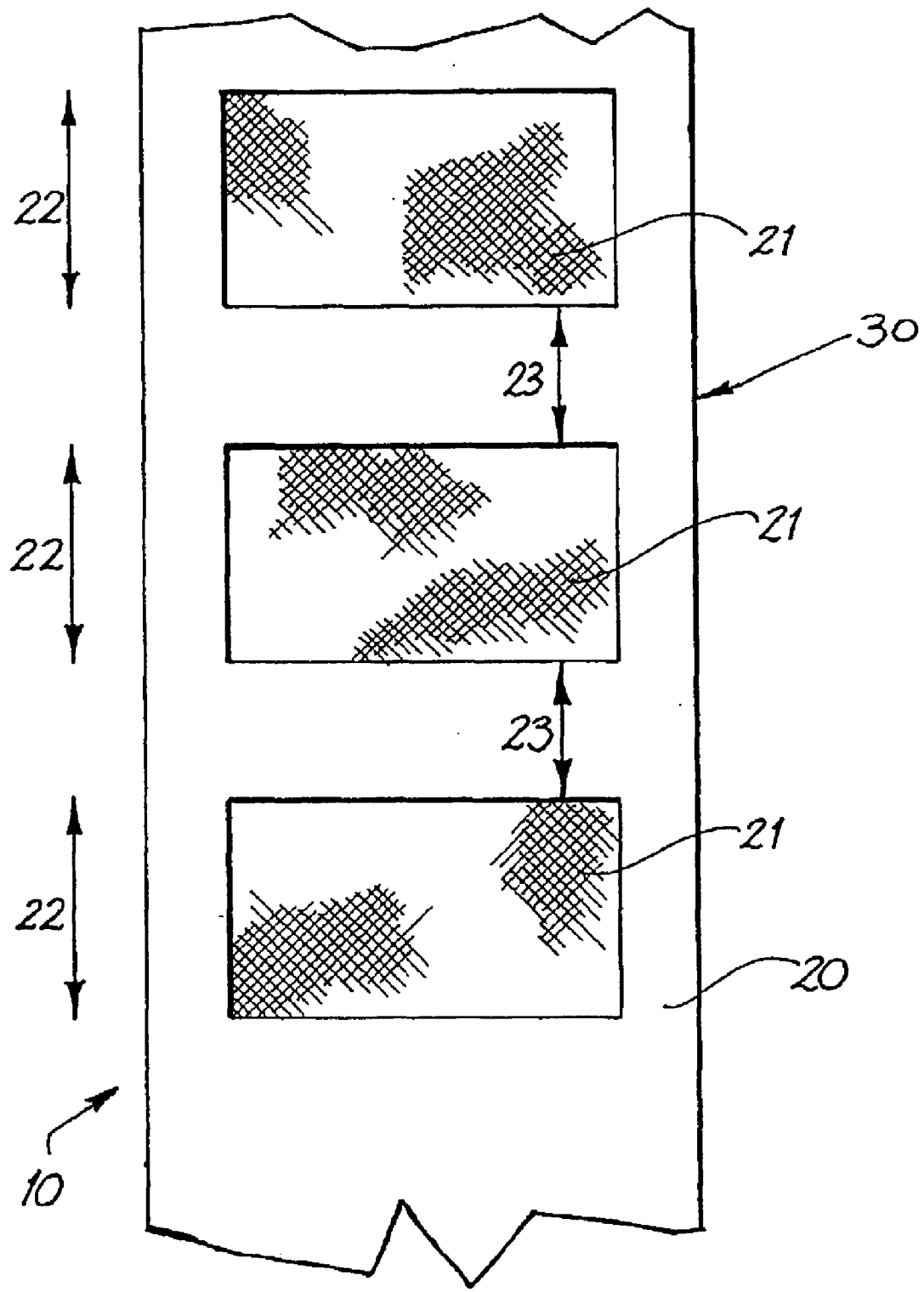
FIG. 3 is a plan schematic view of the face of the conveyor belt containing discrete electrically conductive segments of permeable materials.

As shown in FIGS. 2 and 3, the porous conveyor belt 10 is formed with both a conductive and a non-conductive portion. The non-conductive portion of the belt 10 is formed from a porous polymer webbing 20, although equivalent non-conductive (insulating) fluid permeable media could typically include synthetic or natural rubber etc having holes or other perforations therein. The belt 10 has rectangular apertures in the porous polymer webbing 20 into which are mounted conductive mesh segments or patches 21, spaced from one another by porous polymer webbing portions 23 which are electrically insulating. The edges of the patches 21 approach closely to the edge of the belt 10. In the wedge zone 19, liquid can drain from the sludge under gravity and compressive forces through both the porous polymer webbing 20 of the belt 10 and through the conductive mesh patches 21.

The conductive mesh patches 21 are connected into an electrical circuit as schematically illustrated in FIG. 2 in order to provide an electrical field so as to assist in the removal of interstitial liquid from the solid material in the sludge 12 by electro-osmosis when compressed between the belts 10, 16. Electrical control units 31 are adapted to be switched on by a control switch 32 and relay to apply voltage so that each of the patches 21 located around the rotary drum 14 becomes an anode, the electrical supply also being connected to the surface of the rotary drum 14 which is conductive and becomes a cathode. When the drum rotates anti-clockwise and a patch 21 moves beyond the contact switch 32, the contact switch engages the porous polymer webbing 23 between patches 21 and causes an interruption of the voltage applied to the patches 21 located around the rotary drum 14. This occurs when contact rollers 31A, B and C are no longer in contact with any of the previously associated patches 21. Further motion causes the next patch to come under contact switch 32, by which time the leading edges of the following three patches become engaged with contact rollers 31A, 31B and 31C. The electric field is again applied and electro-osmosis can occur.

When the present apparatus is in in electrodewatering mode, the rotary drum 14 is cathodic in nature and the patches 21 are anodic due to the polarity of the applied electric field. The secondary porous conveyer belt 16 is preferably an electrically insulating porous polymer webbing such as a polymer mesh, which, together with the compressed sludge, provides a substantial electrical insulation between the cathode and anode. The electro-osmotic force on the liquid urges it through the porous secondary belt 16 and into the rotary drum 14 via its porous surface structure.

Each patch 21 is preferably formed from woven metallic wire mesh, and may be either externally affixed at all sides to the porous polymer webbing 20 of the conveyer belt 10, or actually formed from metallic wire mesh which has been woven into the primary conveyor belt 10. Alternative conductive materials which could be used to make up the patches 21 would include any type of metal mesh thread or wire, carbon fibres, carbon impregnated polyester, stainless steel impregnated polyester or other synthetic materials which are conductive in their own right.

In the present embodiment, the use of discrete, permeable conductive patches 21 allows greater control of where and how electric current may flow through the sludge filter cake. Earlier work on conveyor belt presses with a full length conductive mesh showed that the electric current preferred to pass through that area of the filter cake where there was bulk free water, and therefore very little electro-osmotic dewatering occurred in other parts of the cake. When the conductive material needed are presented discretely, areas of sludge can be exposed to separate current flows, sometimes at different voltages, in order to achieve maximum dewatering.

Such equipment allows much higher local voltages to be applied than shown in the prior art, which in turn allows use of a high current density. Such tailoring of current flow can enhance the kinetics of water removal and provide a greater degree of moisture reduction than shown in results in the prior art.

Each patch 21 is of rectangular shape to provide maximum use of the face area of the primary conveyer belt 10. The ratio of the distance 23 between patches 21 in relation to the length 22 of each patch is determined by the dimensional characteristics of the rotary drum 14. In other embodiments the element adapted for receiving an opposite electric charge to the primary conveyer belt patches may in fact be a second conveyor belt, or a pressure plate rather than a rotary drum.

A defined distance is provided on the margins of each patch 21 to separate them from one another and from the outermost edge 30 of the primary porous conveyor belt 10 in order to prevent dissipation or short circuiting of the electrical current to any part of the rest of the apparatus 8. The cumulative area of the discrete patches 21 is such that when placed in electrical contact with an available area of the rotary drum 14, the electrical power consumption may be optimised, and the dewatering performance may also be optimised.

In the preferred embodiment, each patch 21 is positioned flush with the upper surface of the primary porous conveyor belt 10 which faces onto the secondary porous conveyer belt 16. When the sludge filter cake has been rotated about the rotary drum 14 in an anticlockwise direction, the cake then cleanly discharges from the primary porous conveyer belt 10 and rests on the secondary porous conveyer belt 16. The now unloaded primary porous conveyer belt 10 is moved over rollers 15 and any residual dried filter cake is cleaned from this belt 10 by a knife edge so that no significant residual solid remains on its upper surface prior to the introduction of new sludge onto that primary belt 10 in the drainage zone.

In a further embodiment of the apparatus, the filter cake which rests on the secondary conveyer belt 16 may be re-exposed to electro-osmosis in turn by applying the technique at a second rotary drum. In such an embodiment, for the treatment of once-dried sludge, the secondary belt 16 bearing the filter cake is oriented so that it can assume the role of a primary filter belt, and the filtered sludge seated thereon is again passed through a wedge zone and a subsequent electro-osmosis step at the second rotary drum. It is envisaged that the same solid material can be passed over a number of dewatering drums in sequence, in perhaps as many as five or six consecutive electrodewatering stages.

It is envisaged that each dewatering patch 21 can be configured to have a different voltage/current regime and that the polarity of the field could be reversed to allow electro-osmotic diffusion to be towards the wetter surface of the cake, if required. When reverse polarity is applied the patches 21 become cathodes and liquid is removed from the sludge through the patches 21 and into some sort of collection device or container located below the primary porous conveyor belt 10.

In further embodiments of the apparatus the primary porous conveyer belt may have a more complex three dimensional weave of conductive thread or wire material therethrough. For example, when the primary belt is viewed in cross-section at one longitudinal position, a number of 'patches' may be positioned flush with the upper surface of the belt, with each patch linked to each other across the width of the belt by a loop of conductive material that is exposed over a small area on the underside of the belt and between the patches. Although the conductive material is therefore predominantly flush with the sludge, the positioning of some of the conductive material on the underside of the belt facilitates the electrical contact required with the electrical control units 31.

In still further embodiments, it is possible that each patch of woven metallic wire mesh can extend to the side extremity of the primary belt to form a selvage or woven/sewn edge of the wire to prevent fraying. However in such an embodiment, the width of the primary belt would need to be narrower than the width of the secondary belt and the rotary drum (or other opposing conductive element) in order to prevent dissipation or short circuiting of the electrical current to any part of the rest of the apparatus 8.

Importantly, in each of the preceding embodiments of the invention, each of the 'patches' of conductive material in the primary belt are still discrete from the subsequent patch in the longitudinal direction in the belt, thus allowing for the use of localised voltages and current densities to enhance the kinetics of dewatering.

By experimental work, optimisation of the shape and configuration of the components may be achievable along with optimisation of the processing conditions including the selection of applied electric fields and compressive forces.

Figure 4:
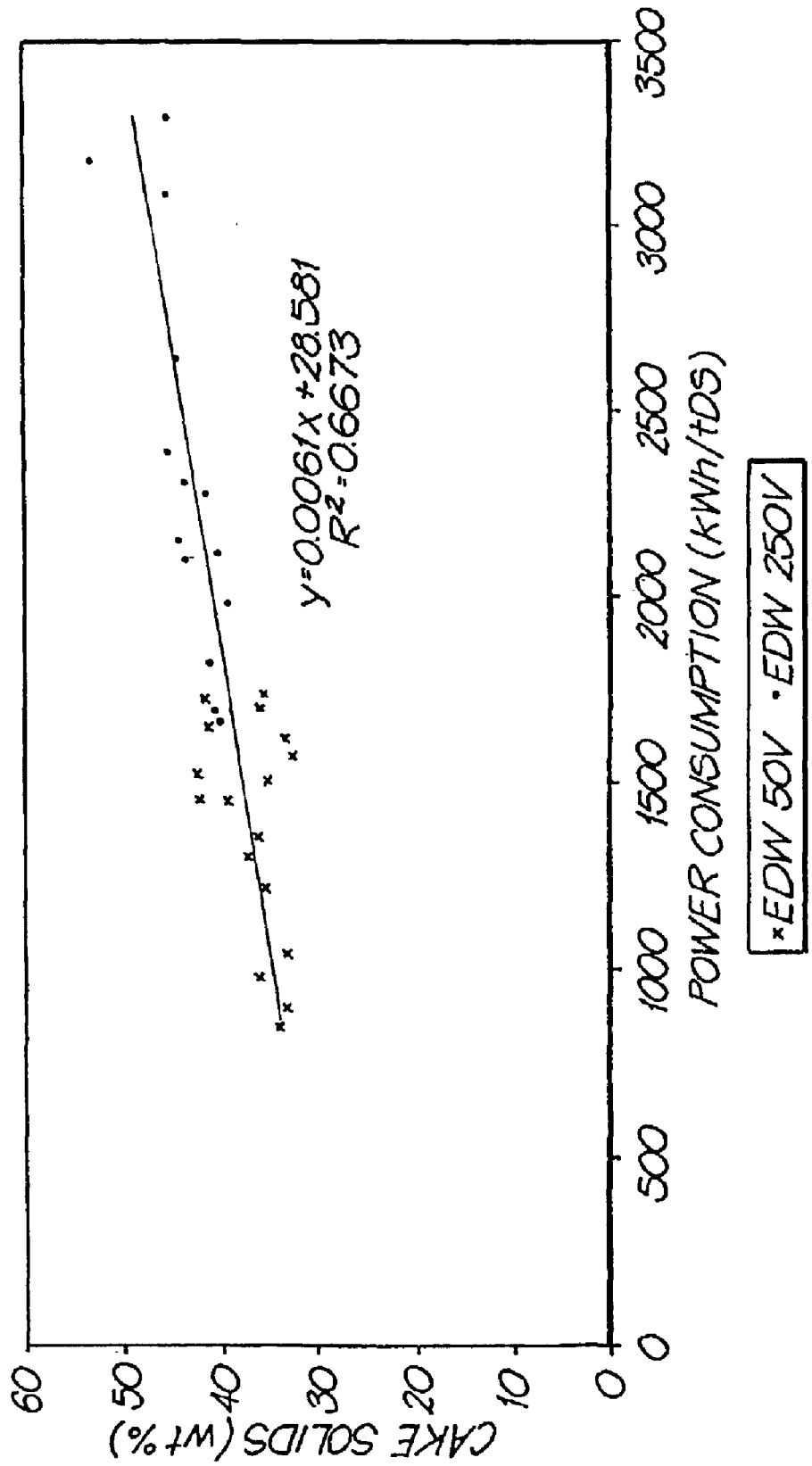
FIG. 4 shows some of the experimental results of product cake solids (% w/w) as a function of power consumption (kWh/tonne dry solids) produced using the equipment shown in of FIGS. 1–3.

Referring now to FIG. 4, experimental results are illustrated with apparatus based on the schematic design of FIGS. 1 to 3 used with sewage sludge containing a solids content of around 3% w/w conditioned prior to filtration with flocculant solution, and passed onto the conveyor belt 10. The applied voltage on each patch ranged up to 250V DC with a current of up to 20 A, yielding a current density of around 400 A/m$^2$. The experimental relationship between the weight percentage of product cake solids and the power consumption in kWh per tonne of dry solids processed is shown in FIG. 4. Product cake solids of 40–50% w/w solids are considered typical.

It is to be understood that, if any prior art publication is referred to herein, such reference does not constitute an admission that the publication forms a part of the common general knowledge in the art, in Australia or any other country.

What is claimed is:

1. Apparatus for electrodewatering and recovery of solid material from a solid-liquid mixture, the apparatus having:
   (a) a conveyor belt adapted for receiving the solid-liquid mixture thereon and for receiving an electric charge;
   (b) an element positioned in juxtaposition to the conveyor belt and adapted for receiving an opposite electric charge to the conveyor belt;
   (c) an electrical system for establishing an electric field by applying the electric charge and the opposite electric charge;
   (d) means for moving the element in juxtaposition with the conveyor belt to apply a continuous compressive force to the mixture between the conveyor belt and the element while the conveyor belt is moving;
   (e) the conveyor belt having a plurality of discrete, flexible, electrically conductive segments permeable to the liquid and for receiving the electric charge, the segments being located on or within the conveyor belt such that liquid can pass through the segments; and
   (f) the electrical system having means for applying the opposite electric charge separately to individual ones of said conductive segments whereby during the motion of the conveyor belt, liquid is urged from the mixture through the segments under the influence of the compressive force and the electric field.

2. Apparatus as claimed in claim 1 and wherein the element is a porous rotary drum adapted to receive liquid from the solid liquid mixture as the conveyor belt moves around the drum with compressive force applied to the solid-liquid mixture and the electric field is established between the rotary drum and the segments.

3. Apparatus as claimed in claim 2 and wherein a secondary porous conveyor belt which is electrically insulating is included and in use moves around the rotary drum, the solid-liquid mixture being located between the secondary belt and the conveyor belt and segments.

4. Apparatus as claimed in claim 2 and further comprising means for removing dry filter cake containing solids from the conveyor belt.

5. Apparatus as claimed in claim 3 and further comprising means for removing dry filter cake containing solids from the conveyor belt.

6. Apparatus as claimed in claim 1 wherein each segment is formed from woven metallic wire mesh, and is affixed at all sides to an aperture in the conveyor belt which is of electrically insulating material.

7. Apparatus as claimed in claim 1 wherein each segment is formed from woven metallic wire mesh woven into the conveyor belt which is of electrically insulating material.

8. Apparatus as claimed in claim 1 wherein the segments each lie flush within the conveyor belt.

9. Apparatus as claimed in claim 1 wherein each segment is a rectangular sub-section of the conveyor belt.

10. Apparatus as claimed in claim 1 wherein each segment is inset a distance from opposite edges of the conveyor belt.

11. Apparatus as claimed in claim 1 wherein the apparatus further includes an electrical power supply for applying a voltage between the element and at least one segment as it passes in juxtaposition to the element, and control means for applying the voltage when at least one segment is disposed for applying the electrical field at a selected location and interrupting the electric field when a portion of the conveyor belt between segments is at that selected location.

12. Apparatus as claimed in claim 11 and wherein the element is a porous rotary drum adapted to be connected to become a cathode and to receive liquid from the solid-liquid mixture as the conveyor belt moves around the drum with compressive force applied to the solid-liquid mixture and the segments are adapted to be anodes.

13. Apparatus as claimed in claim 12 and wherein a secondary porous polymer webbing conveyor belt which is electrically insulating in use moves around the rotary drum, the solid-liquid mixture being located between the secondary belt and the conveyor belt and segments.

14. Apparatus as claimed in claim 12 wherein means are provided for removing dried filter cake containing solids from the conveyor belt.

15. Apparatus as claimed in claim 13 wherein means are provided for removing dried filter cake containing solids from the conveyor belt.

16. Apparatus as claimed in claim 1 and wherein control means are provided for separately controlling the electric field in the conductive segments during motion of the conveyor belt, control being capable of being varied along the path along which the conveyor belt passes.

17. Apparatus for electrodewatering and recovery of solid material from a solid-liquid mixture, the apparatus having:
   (a) a conveyor belt adapted for receiving the solid-liquid mixture thereon;
   (b) a conveyor belt having a plurality of discrete electrically conductive segments permeable to the liquid and located on or within the conveyor belt such that liquid can pass through the segments, the segments being adapted to have applied thereto respective electric charges;
   (c) a compression belt mounted in juxtaposition to the conveyor belt for movement therewith to apply a compressive force to the mixture when conveyed and supported on the discrete segments;
   (d) an element positioned in juxtaposition to the compression belt and adapted for receiving an opposite electric charge to the conveyor belt segments;
   (e) means for applying the electric charge to each of the segments as they move and applying the opposite electric charge to the element to establish an electric field whereby the electrical system has means for applying the opposite electric charge separately to individual ones of said conductive segments.

18. Apparatus as claimed in claim 17 wherein the element is in the form of a porous rotary drum adapted to be connected to become a cathode and to receive liquid from the solid-liquid mixture as the conveyor belt moves around the drum with compressive force applied to the solid-liquid mixture and the segments are adapted to be anodes.

* * * * *